Figure 11:
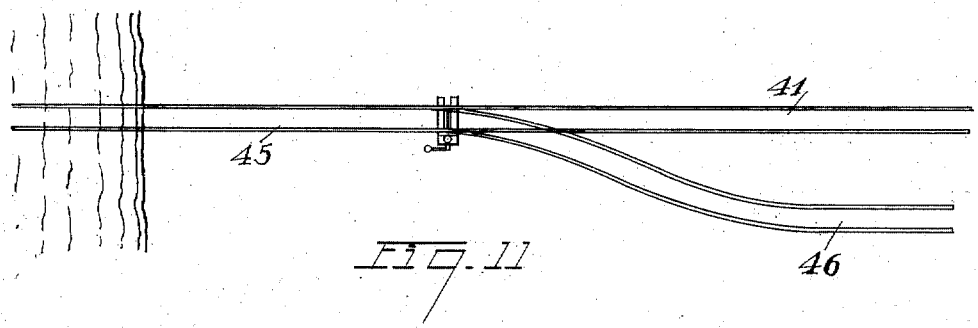

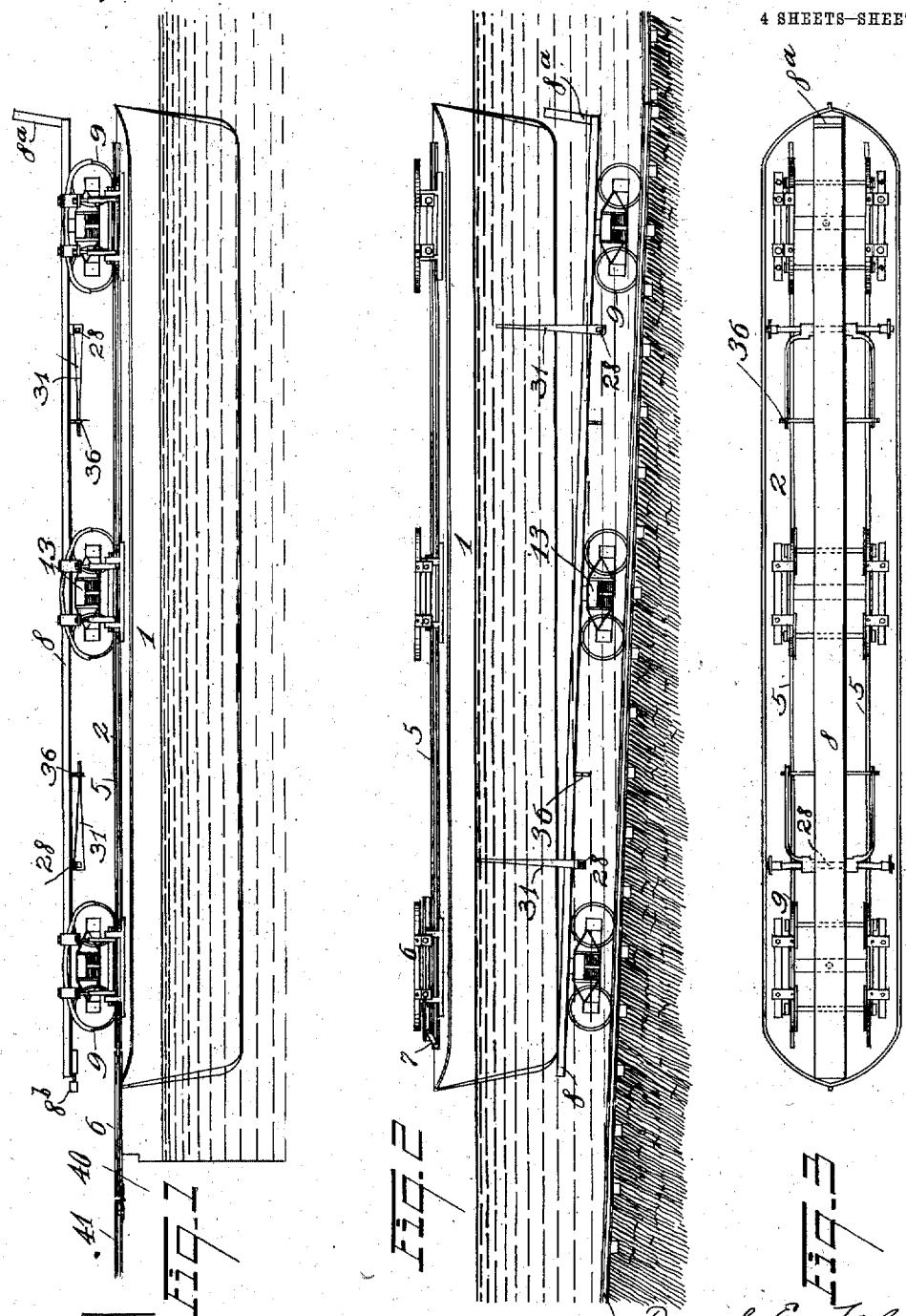

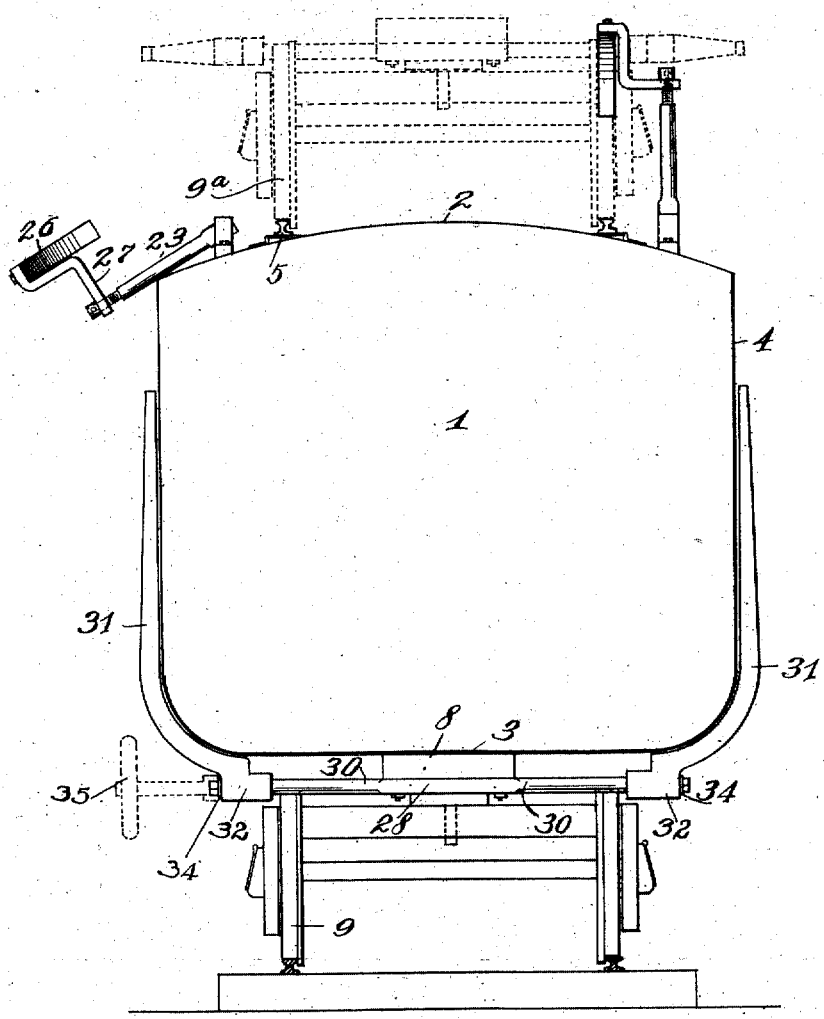

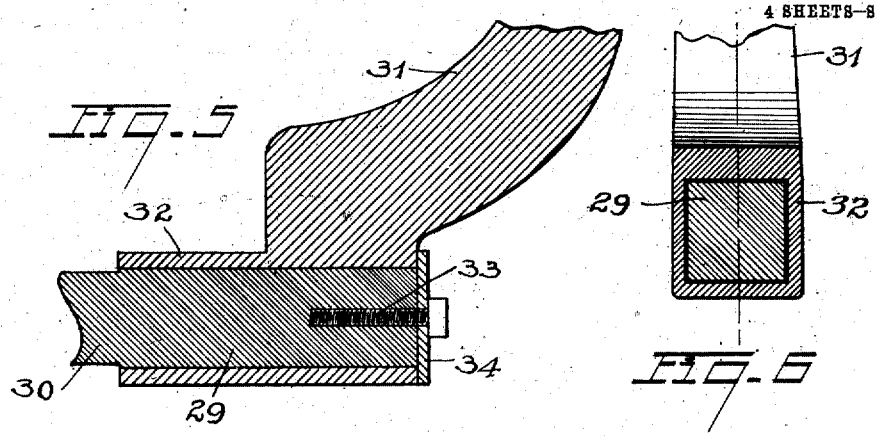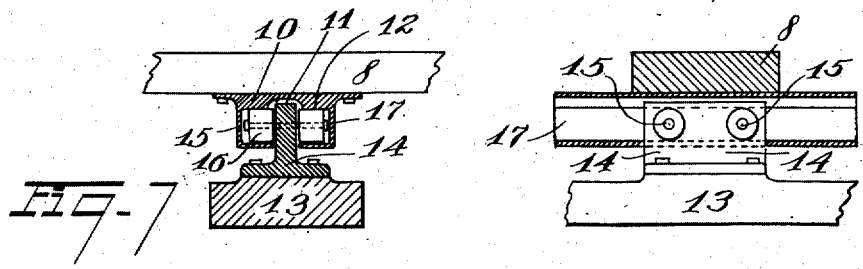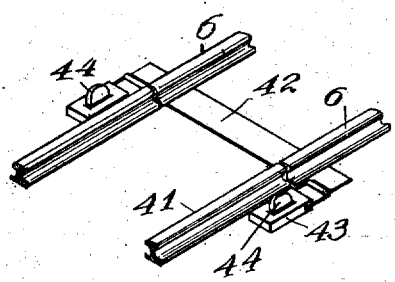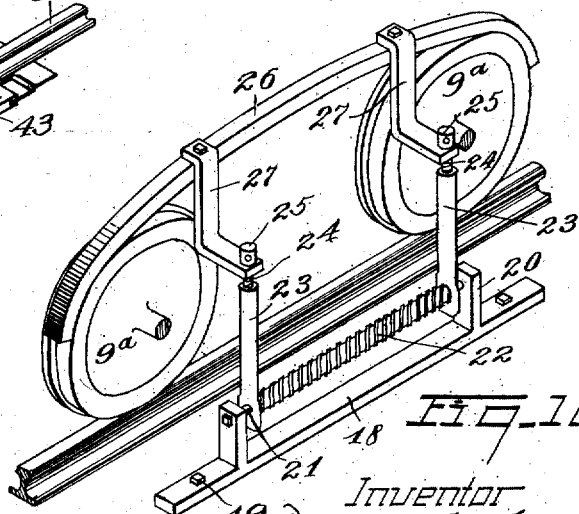

D. E. FALVEY.
SYSTEM OF TRANSPORTATION FOR VEHICLES AND THEIR CARGOES.
APPLICATION FILED NOV. 1, 1909.

986,153.

Patented Mar. 7, 1911.

4 SHEETS—SHEET 4.

Witnesses:
Oliver M. Kappler.
M. E. Taif.

Inventor
Daniel E. Falvey
By Bates, Fouts & Hill
Attys.

UNITED STATES PATENT OFFICE.

DANIEL E. FALVEY, OF DETROIT, MICHIGAN.

SYSTEM OF TRANSPORTATION FOR VEHICLES AND THEIR CARGOES.

986,153.     Specification of Letters Patent.     Patented Mar. 7, 1911.

Application filed November 1, 1909. Serial No. 525,702.

*To all whom it may concern:*

Be it known that I, DANIEL E. FALVEY, a citizen of the United States, residing at Detroit, in the county of Wayne and State of Michigan, have invented a certain new and useful Improvement in Systems of Transportation for Vehicles and Their Cargoes, of which the following is a full, clear, and exact description, reference being had to the accompanying drawings.

This invention relates to transporting apparatus and systems, and, more particularly to an apparatus and system whereby vehicles of a special type, with their cargoes intact, may be conveniently lowered or let into the water and transported over canals, rivers, or other stretches of waterway, the bodies of the vehicles being used as barges to carry the freight.

By the invention disclosed herein, each vehicle while being transported over a waterway is in effect a barge and is enabled to carry, in a particularly convenient manner, the running gear or carriage by means of which it has been lowered into the water and by means of which it may be hauled out onto a railway if necessary or desirable to employ it as a car for railway transportation.

Generally speaking, the invention may be defined as consisting of the combinations of parts and elements embodied in the claims hereto annexed and illustrated, in one embodiment, in the drawings forming part thereof wherein—

Figure 12:
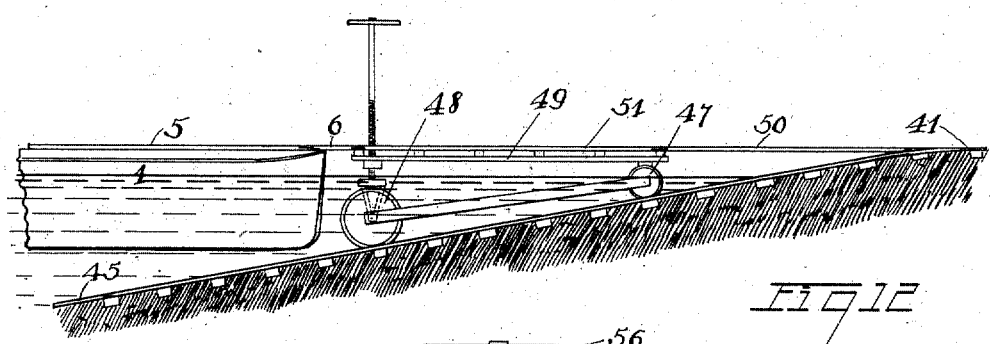

Figure 1 represents a side elevation of one of my cars at a landing, with the track section carried by the car body connected to a track at the landing, whereby the carriage may be run on to the car, as shown, and transported therewith along a waterway or may be used for the purpose of hauling the car out at a landing when desirable to transport the car along a railway. Fig. 2 represents a side elevation of the car above an incline, showing the carriage beneath the same, the parts being in the position which they will assume preparatory to hauling the car out. Fig. 3 represents a plan view of the car or barge shown in Fig. 1; Fig. 4 represents an enlarged end elevation of the car and carriage, the dotted lines representing the manner in which the carriage may be secured in place on top of the car; Figs. 5 and 6 represent details of the side clamps by means of which the car is held in place on the carriage. Figs. 7 and 8 represent details of the connection between the central truck and the carriage. Fig. 9 is a detail illustrating the manner of connecting a track section carried by the car with a track at the landing. Fig. 10 represents a detail in perspective of one of the clamps used to secure the carriage in place on the car; Figs. 11 and 12 diagrammatic views of the landing for the car and carriages and Fig. 13 a detail of the landing truck.

My invention as disclosed herein, is designed with reference to the handling of vehicles which are readily convertible from cars into boats or barges, and vice versa, the vehicle bodies being of relatively great length and narrow width and substantially rectangular in cross section, the bottoms and tops of such bodies being substantially flat, thereby adapting them more conveniently for the purpose of applying and receiving a carriage for transportation purposes.

Referring now to the embodiment of my invention shown in the drawings, 1 denotes a vehicle body. This body is provided with a top 2, which top is slightly rounded, and with a bottom 3 which is substantially flat, the body having sides 4 which are substantially straight. The body is provided on its top with rails 5 extending substantially the length thereof and forming a support for the carriage. Relatively short extension rails 6 are pivotally connected to the rails 5, as by means of suitable links 7. For convenience, of reference, the end of the body which carries the pivoted rail sections 6 will be referred to as the front and the opposite end as the rear.

With the body described, I employ a special form of carriage. This carriage comprises a longitudinal center sill 8, supported by three trucks; namely, a pair of end trucks and a central truck, the necessity for using the central truck arising from the length of the car body to be transported thereby. The front and rear trucks 9 are of any approved construction and may be connected to the carriage in any convenient or conventional manner. To enable the central truck to support the sill 8 and to maintain such support when going around curves, I provide a connection between said truck and sill such as is shown in Figs. 7 and 8. The center sill is provided on its lower surface with the metallic bearing plate 10, said bearing plate extending transversely of said sill and being provided with a transversely extending recess 11 and with flat bearing surfaces 12 on each side of said recess. 13 denotes a cross piece carried by the center truck. This cross piece is provided with a T-beam 14 the web of which projects upwardly into the recess 11. This web provides a bearing for a suitable number of journal pins 15. These pins project through the web of the beam 14, and each is provided on opposite sides of said web with a roller 16. These rollers are engaged by the surfaces 12. As the carriage rounds a curve, the construction described permits of sufficient relative movement between the center sill 8 and the truck therebeneath to accommodate the carriage to such curve. The rollers will be conveniently inclosed in a housing 17 formed with or carried by the bearing plate 10 and shown in dotted lines in Fig. 8.

In Figs. 4 and 10, I have shown a convenient construction for clamping the carriage on top of the vehicle body while the latter is being transported along a waterway. On each side of the center and both ends of the body there is mounted a swinging clamp which is adapted to engage the wheels of the corresponding truck and to be conveniently unclamped therefrom when it is desired to remove the carriage, as when approaching a landing. 18 denotes a base member which may be secured to the top of the body, as by means of bolts 19. 20 denotes a pair of brackets projecting upwardly from said base member and 21 a rod mounted in said brackets and free to turn therein. This rod is provided with a threaded portion 22 on which are threaded the arms 23. 24 denotes rods which are threaded into said arms and each is provided with a head 25 by means of which it may be adjusted in its appropriate arm. 26 denotes a clamping member proper which is secured to a pair of angle arms 27, the latter arms being mounted on the rods 24. The ends of 26 are curved to correspond in contour to the truck wheels 9ª. As will appear by reference to Figs. 4 and 10, when the carriage has been run onto the rails 5 it may be conveniently secured in place by swinging the arms 23 with their attached arms 27 and clamping members 26 to the position shown in full lines in Fig. 4 and then, by setting up on the rods 24, the truck will be secured firmly in place. The arms 27 being rotatable with respect to the rods 24, it follows that the clamp 26 may be adjusted to secure proper engagement with the truck wheels. By rotating the rod 22, the arms 23 and the clamp carried thereby may be given a longitudinal adjustment which will facilitate the application of the clamping members 26 to the wheels. 28 denotes a pair of shafts extending across the center sill 8 near the front and rear ends thereof, respectively, said shafts being connected to said sill in any convenient manner, as by bolts. The outer end portions of the shaft are squared, as shown at 29, being reduced in cross-section and rounded between the center and the outer end portions, as shown at 30. These angular end portions are for the application of arms 31, said arms being intended to engage the sides of the vehicle body when the latter is being lowered into or hauled out of the water as well as when being transported by rail. Each arm is of such contour as to engage the side and a portion of the bottom of the body and is provided with a squared or angular socket 32 adapted to receive the outer squared or angular end 29 of the shaft 28. The sockets 32 are of considerable length and the parts will be so proportioned that, when the arms are in engagement with the sides of the vehicle body, the sockets will project beyond the outer ends of their respective shafts. To adjust the arms to clamp the body to the carriage, I may employ a bolt 33 for each end of a shaft, said bolt being threaded into a bore in such shaft end and being provided with a flange 34 adapted to abut against the adjacent socket. The outer end of each bolt may be squared for the application of a hand-wheel 35, by rotating which the bolt may be reciprocated. By turning a wheel in the appropriate direction, a flange will be brought into engagement with a corresponding socket and the corresponding arm forced against the side of the vehicle body. When the arms have been so adjusted, the wheels may be removed from their respective bolt ends. When the carriage is out of use, the arms 31 may be adjusted inwardly until their sockets are on the rounded portions 30, when they may be turned down and supported in the position shown in Figs. 1 and 3, the arms being secured by any convenient support, as by arms 36 carried by the center sill.

When a car, in its capacity as a barge, approaches the landing 40 the rail sections 6 are folded down, as shown in Figs. 1 and 9, and are brought in operative relation to rail sections 41 on a landing or landing truck. A convenient manner of bringing said sections into operative relation to each other is shown in Figs. 1 and 9, wherein the rail sections 6 are illustrated as connected by a suitable tie-plate 42, said tie-plate having pivotally connected thereto plates 43 each having a slot adapted to receive a projection 44 on the landing or landing truck and so located with reference to the rails 41 that when the projections are inserted through the slots the ends of the rail sections 6 form continuations of the rails 41.

The rails 41 may be on a landing, as indicated in Fig. 1. It is preferable, however, to employ a landing truck having a track thereon adapted to form a continuation of the track on the top of the body 1, one end of the track on the truck being pivoted, to make connection with the track by means of which the body 1 may be hauled from or lowered into the water. By supporting one end of the track on the landing truck from a vertically adjustable platform, the track carried by said truck may be readily accommodated to variations in height of the tops of the vehicle bodies from the water. In Fig. 11 the landing place is indicated diagrammatically, said landing place having an incline 45 down and away from which the track 41 extends. The track 41 will extend indefinitely from the landing to one or more places to or from which it may be desirable to transport the vehicles when the same are being used as cars.

46 denotes a switch by means of which the carriages for each of the vehicles may be removed from the main track when the vehicles have been lowered into the water and the landing truck is to be employed as well as after the carriages have been removed from the vehicles and before the removal of the landing truck.

Figure 13:
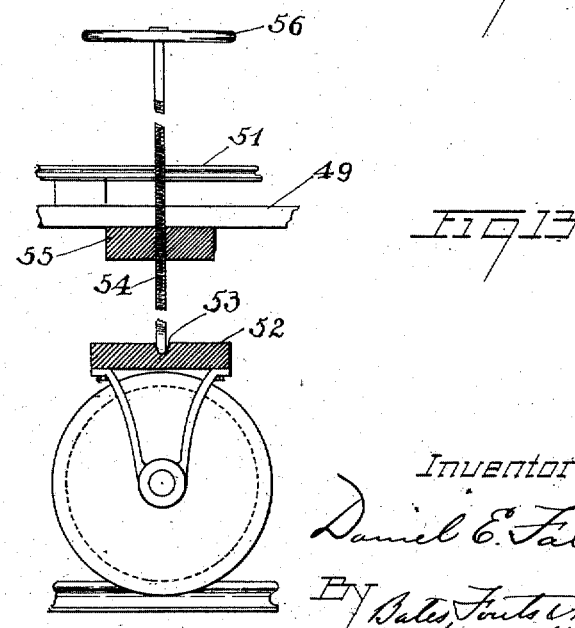

The landing truck which may be employed with marked advantage in my system is shown in Figs. 12 and 13. For convenience of reference, that end of the truck which is brought next to the vehicle will be referred to as the "front" end and the opposite end will be referred to as the "rear" end. The rear wheels 47 of this truck are of small diameter, while the front wheels 48 are of large diameter. The small diameter of the rear wheels enables the rear end of the rail supporting platform 49 to be in close proximity to the incline 45, permitting the use of shorter rail extensions to connect the rails on top of the truck with the rails on the incline while keeping such extensions substantially horizontal, as shown in Fig. 12. The rail extensions referred to are shown at 50 and are pivotally connected to the rear end of the platform 49 and form a continuation of the rails 51 on said platform and are capable of being folded down as shown in Fig. 12.

For the purpose of adjusting the front end of the platform, I have shown a cross plate 52, preferably of metal, which extends transversely across the truck. This cross plate will be provided with a pair of rounded recesses 53, each adapted to receive the lower end of a bolt 54 threaded through a cross plate 55 which supports the platform 49. Each bolt 54 is provided with a hand-wheel 56. By adjusting the hand-wheels, the front end of the platform may be raised and lowered to bring the platform and the track 51 thereon in substantial alinement with the tracks 5 on the vehicles which are temporarily serving as barges. When it is desired to remove the carriage from the top of one of the aforesaid vehicles or to run the carriage on top of the same, the landing truck is lowered down the incline and the front end of the platform is adjusted to bring the track 51 thereon into substantial alinement with the top of the track on the vehicle. The track section 6 is then folded down and secured in the manner shown in Fig. 9. The track section 50 is folded outwardly to form a connection between track 51 and track 41. The carriage may be removed from, or run onto, the temporary barge, as the case may be. In making a landing after the carriage has been removed the landing truck will be run on to the switch, the carriage lowered beneath the vehicle body a sufficient distance, with the arms 31 turned up. The vehicle body is moved above the carriage until its front end engages or is above the forward end of the center sill 8. The vehicle body and the carriage are then hauled out together until the upwardly projecting rear end 8$^a$ of the center sill engages the rear end of the body, after which the body may be hauled out directly by the carriage and transported along the railway 41 as a car. Reversely, when it is desired to convert the vehicle body from a car into a barge, the vehicle body is lowered into the waterway by means of a carriage, the carriage is then hauled out, the landing truck inserted in place, connections made between its rails, the rails 5 and the trackway, and the carriage is then run along the rail sections 50, 51 and 6 on to the rails 5 on top of the vehicle body.

Having thus described my invention what I claim is:

1. The combination, with a landing having an incline, of a track on said landing and extending away from the same, a track on said incline, a vehicle having a track, a carriage for said vehicle, and a movable track section adapted to connect the track on the vehicle with the track on the landing.

2. The combination, with a landing having a track, of a vehicle having a track thereon, a carriage for said vehicle, a pivoted track section carried by the vehicle, and means for temporarily connecting the outer end of said section with the track on the landing.

3. The combination, with a landing having a track, of a vehicle having a track thereon, a carriage for said vehicle, a movable track section, and means whereby said section may be secured in operative relation to the two tracks aforesaid.

4. The combination, with a vehicle having a track thereon, of a carriage, and a pivoted clamping member carried by said vehicle and adapted to secure the carriage in place on said track.

5. The combination, with a vehicle having a track thereon, of a carriage for the transportation of said vehicle, and an adjustable clamping member carried by said vehicle and adapted to secure the carriage in place on said track.

6. The combination, with a vehicle having a track thereon, of a carriage having a truck, and adjustable means carried by said vehicle and adapted to clamp said truck to the track.

7. The combination, with a vehicle having a track thereon, of a carriage having a truck, and adjustable means carried by said vehicle and adapted to engage a truck wheel to secure the carriage to the track.

8. The combination, with a vehicle having a track thereon, of a carriage having a truck, a pivotally supported clamping member for said carriage, and means whereby said member may be adjusted.

9. The combination, with a vehicle having a track thereon, of a carriage having trucks, a clamping device pivoted adjacent to said track and adapted to be swung into and out of engagement with a truck wheel, and means for adjusting said member toward and from said wheel.

10. The combination, with a vehicle having a track thereon, of a carriage having trucks, a clamping device pivoted adjacent to said track and adapted to be swung into and out of engagement with a pair of truck wheels, and means for adjusting said member toward and from said wheels, said member having curved ends adapted to engage said wheels.

11. In a carriage for transporting vehicles, the combination of a center sill, front and rear trucks for said carriage, a central truck, and connections between the latter truck and said sill, said connections comprising a transverse bearing plate carried by the sill, an upwardly projecting transverse member carried by the truck, rollers carried by the said member and adapted to be engaged by said bearing plate, and a housing carried by the bearing plate and inclosing said rollers.

12. In a carriage for the purpose specified, the combination of a center sill, shafts, and arms adjustable longitudinally on said shafts.

13. In a carriage for the purpose specified, the combination of a center sill, shafts carried thereby, arms adjustable longitudinally on said shafts, and means carried by said shafts for adjusting the said arms.

14. In a carriage for the purpose specified, the combination of a center-sill, a pair of shafts, arms adjustable longitudinally along said shafts, and bolts threaded in said shafts and each having means adapted to engage an arm and force the same along its shaft.

15. In a carriage for the purpose specified, the combination of a shaft having angular ends and a rounded portion intermediate of said ends, arms having angular sockets adapted to fit said ends, and means for adjusting said arms along said shafts.

16. In a carriage for the purpose specified, the combination of transversely extending shafts each having angular ends and a rounded portion intermediate of said ends, arms having angular sockets for said ends and adjustable longitudinally thereof, means for adjusting said arms, and means for supporting the ends of said arms which are remote from the sockets.

17. In a carriage for the purpose specified, the combination of a member adapted to support the bottom of a vehicle body, adjustable arms adapted to be turned up or down, and means for supporting said arms when in downturned position.

18. The combination, with a landing having an incline, of a track extending up said incline and along said landing, a truck having a platform, a track on said platform, a track section pivoted to the latter track and adapted to connect the track on the platform with the first-mentioned track, means for adjusting the front end of said platform, a vehicle having a track thereon, and a movable track section adapted to connect the track on said vehicle with the track on said platform.

19. The combination, with a landing having a track, of a vehicle having a track thereon, and a landing truck having an adjustable track thereon adapted to connect the track on the vehicle with the landing track.

20. The combination, with a landing having an incline and a track on said incline, of a vehicle having a track thereon, a landing truck, a track carried thereby, a movable track section adapted to connect said truck and said vehicle, means for adjusting the track on the truck, and a movable track section adapted to connect the track on the truck with the landing track.

21. The combination, with a landing having an incline and a track on said incline, of a vehicle having a track thereon, a landing truck having a track thereon and provided with means for vertically adjusting the front end of said track, a movable track section adapted to connect the track on the vehicle with that on the landing truck, and a movable track section adapted to connect the track on the landing with that on the truck.

In testimony whereof, I hereunto affix my signature in the presence of two witnesses.

DANIEL E. FALVEY.

Witnesses:
F. J. BERSCHBACH,
WM. A. GREEN.

---

Copies of this patent may be obtained for five cents each, by addressing the "Commissioner of Patents, Washington, D. C."